(12) United States Patent
Goldstein et al.

(10) Patent No.: US 11,049,200 B2
(45) Date of Patent: Jun. 29, 2021

(54) USER DETECTION BASED ON LOCATOR-EMBEDDED IDENTIFIER

(71) Applicant: Hipmunk, Inc., San Francisco, CA (US)

(72) Inventors: Adam Julian Goldstein, San Francisco, CA (US); William Robert Glass, San Francisco, CA (US); Melissa Anne Skevington, San Francisco, CA (US); Andrew Joseph Dawson, Seattle, WA (US); Steven Clarke, San Francisco, CA (US); Ha Tu Hang, San Francisco, CA (US); Thomas Pierre Robert Genin, San Francisco, CA (US); Navin Lal, San Francisco, CA (US)

(*) Notice: Subject to any disclaimer, the term of this patent is extended or adjusted under 35 U.S.C. 154(b) by 527 days.

(21) Appl. No.: 15/832,222

(22) Filed: Dec. 5, 2017

(65) Prior Publication Data

US 2019/0066240 A1 Feb. 28, 2019

Related U.S. Application Data

(60) Provisional application No. 62/550,306, filed on Aug. 25, 2017.

(51) Int. Cl.
*G06Q 10/02* (2012.01)
*G06Q 50/14* (2012.01)
(Continued)

(52) U.S. Cl.
CPC ......... *G06Q 50/14* (2013.01); *G06F 16/9535* (2019.01); *G06Q 10/02* (2013.01); *G06Q 40/12* (2013.12)

(58) Field of Classification Search
CPC .... G06F 16/9566; G06Q 50/14; G06Q 40/12; G06Q 10/12
See application file for complete search history.

(56) References Cited

U.S. PATENT DOCUMENTS 7,720,702 B2 5/2010 Fredericks et al.
8,620,750 B2 12/2013 DePasquale et al.
(Continued)

OTHER PUBLICATIONS

Wang, Yunsen, and Alexander Kogan. "Designing privacy-preserving blockchain based accounting information systems." SSRN Electronic Journal (2017). (Year: 2017).*
(Continued)

*Primary Examiner* — Scott M Tungate
(74) *Attorney, Agent, or Firm* — Schwegman Lundberg & Woessner, P.A.

(57) ABSTRACT

A server machine is configured to map an identifier of a user to an account of the user within a database. The server machine also embeds the identifier within a uniform resource locator (URL) that, when operated by a browser of the user, causes the browser to interact with a supplier server machine. The server machine later receives interaction result data from the supplier server machine, and the interaction result data includes the identifier of the user and an interaction detail resultant from the interaction initiated by the browser with the supplier server machine. A machine then detects that the interaction detail corresponds to the account of the user based on the identifier being both received in the interaction result data and mapped to the account of the user. Accordingly, the server machine causes inclusion of the interaction detail within an information entry that corresponds to the user.

20 Claims, 5 Drawing Sheets

(51) Int. Cl.
*G06Q 40/00* (2012.01)
*G06F 16/9535* (2019.01)

(56) References Cited

U.S. PATENT DOCUMENTS

| | | | |
|---|---|---|---|
| 8,712,811 B2 | 4/2014 | Fredericks et al. | |
| 2005/0144048 A1* | 6/2005 | Belanger | G06Q 10/02 |
| | | | 705/5 |
| 2005/0154751 A1* | 7/2005 | Levi | G06Q 10/10 |
| 2011/0258005 A1 | 10/2011 | Fredericks et al. | |
| 2012/0209686 A1* | 8/2012 | Horowitz | G06Q 30/0633 |
| | | | 705/14.26 |
| 2014/0278597 A1* | 9/2014 | Wilkinson | G06Q 10/02 |
| | | | 705/5 |
| 2016/0132977 A1 | 5/2016 | Fredericks et al. | |
| 2017/0195274 A1* | 7/2017 | Liberty | H04L 51/22 |

OTHER PUBLICATIONS

"European Application Serial No. 18186504.9, Office Action dated Oct. 5, 2018", 10 pgs.

Bujlow, Tomasz, et al., "A Survey on Web Tracking—Mechanisms, Implications, and Defenses", Proceedings of the IEEE. vol. 105, No. 8, (Aug. 2017), 1476-1510.

Falahrastegar, Marjan, et al., "Tracking Personal Identifiers Across the Web", MICCAI Lecture Notes in Computer Science, pp. 31-34, (2016), 30-41.

Mayer, Jonathan, et al., "How Verizon's Advertising Header Works", [Online]. Retrieved from the Internet: <URL: http://webpolicy.org/2014/10/24/how-verizons-advertising-header-works/>, (2014), 3 pgs.

Mayer, Jonathan, et al., "Third-Party Web Tracking—Policy and Technology", IEEE Symposium on Security and Privacy, (2012), 413-427.

* cited by examiner

USER DETECTION BASED ON LOCATOR-EMBEDDED IDENTIFIER

CROSS-REFERENCE TO RELATED APPLICATION

This application claims the priority benefit of U.S. Provisional Patent Application No. 62/550,306, filed Aug. 25, 2017, which is incorporated herein by reference in its entirety.

TECHNICAL FIELD

The subject matter disclosed herein generally relates to the technical field of special-purpose machines that facilitate automatic integration of data into one or more tracking systems, including software-configured computerized variants of such special-purpose machines and improvements to such variants, and to the technologies by which such special-purpose machines become improved compared to other special-purpose machines that facilitate automatic integration of data into one or more tracking systems. Specifically, the present disclosure addresses systems and methods to facilitate user detection based on a locator-embedded identifier, which may be performed, for example, during automatic integration of travel data into a travel tracking system.

BACKGROUND

In some large companies, how employees make (e.g., book or otherwise reserve) their business travel arrangements is controlled by their employers. For example, employees may be required to use a single entity (e.g., company or other organization) with whom the employer has a pre-established relationship for booking all business trips. The single entity may be or include a particular travel service, a specific website, an in-house travel department, or some combination thereof. When a business trip is booked by an employee, the employer receives details of the booking, and the employer accordingly can determine when and where the employee is traveling and determine the costs of the business trip, since all of the details are coming from or going through the single entity with whom the employer has the pre-established relationship.

However, oftentimes employees of small or medium companies want to have some choice in how to book their business travels (e.g., directly with individual airlines or individual hotels). When a company does not have a single mandatory channel for making business travel arrangements (e.g., no particular travel service, specific website, or in-house travel department), the company may lack the ability to consistently receive corresponding travel data. That is, the company may be fully or partially unable to track when and where its employees are going, how much the employees are spending, how far in advance the employees are booking their tickets, and so on.

BRIEF DESCRIPTION OF THE DRAWINGS

Some embodiments are illustrated by way of example and not limitation in the figures of the accompanying drawings.

SUMMARY

The following enumerated embodiments describe various example embodiments of methods, machine-readable media, and systems (e.g., machines, devices, or other apparatus) discussed herein.

A first embodiment provides a method comprising:
mapping, by one or more processors of a consolidation server machine, an identifier of a user to an account of the user within a database;
embedding, by one or more processors of the consolidation server machine, the identifier of the user within a uniform resource locator (URL) that, when operated by a browser of the user, causes the browser to interact with a supplier server machine;
providing, by one or more processors of the consolidation server machine, the URL that includes the identifier of the user to the browser of the user, the browser initiating an interaction with the supplier server machine by operating the URL;
receiving, by one or more processors of the consolidation server machine, interaction result data from the supplier server machine, the interaction result data including the identifier of the user and an interaction detail resultant from the interaction initiated by the browser of the user with the supplier server machine;
detecting, by one or more processors of the consolidation server machine, that the interaction detail corresponds to the account of the user based on the identifier that was embedded within the URL being both received in the interaction result data and mapped to the account of the user within the database; and
causing, by one or more processors of the consolidation server machine, inclusion of the interaction detail within an information entry that corresponds to the user based on the detecting that the interaction detail corresponds to the account of the user.

A second embodiment provides a method according to the first embodiment, further comprising:
generating the identifier of the user prior to the mapping of the identifier to the account of the user within the database.

A third embodiment provides a method according to the second embodiment, wherein:
the generating of the identifier of the user randomly generates the identifier of the user.

A fourth embodiment provides a method according to the second embodiment or the third embodiment, wherein:
the generated identifier of the user is unique within the consolidation server machine.

A fifth embodiment provides a method according to any of the second through fourth embodiments, wherein:
the generating of the identifier of the user is in response to a request to initiate the interaction by the browser of the user with the supplier server machine.

A sixth embodiment provides a method according to any of the first through fifth embodiments, further comprising:
receiving a request from the browser of the user, the request being to initiate the interaction by the browser with the supplier server machine; and wherein
the mapping of the identifier of the user to the account of the user is in response to the request to initiate the interaction by the browser with the supplier server machine.

A seventh embodiment provides a method according to any of the first through sixth embodiments, further comprising:
receiving a request from the browser of the user, the request being to initiate the interaction by the browser with the supplier server machine; and wherein
the embedding of the identifier of the user within the URL is in response to the request to initiate the interaction by the browser with the supplier server machine.

An eighth embodiment provides a method according to any of the first through seventh embodiments, wherein:
the causing, by one or more processors of the consolidation server machine, of the inclusion of the interaction detail within the information entry that corresponds to the user includes causing a company server machine to generate or update an expense report that corresponds to the user.

A ninth embodiment provides a method according to any of the first through eighth embodiments, wherein:
the causing, by one or more processors of the consolidation server machine, of the inclusion of the interaction detail within the information entry that corresponds to the user includes causing a company server machine to generate or update an itinerary manager that corresponds to the user.

A tenth embodiment provides a method according to any of the first through ninth embodiments, wherein:
the causing, by one or more processors of the consolidation server machine, of the inclusion of the interaction detail within the information that corresponds to the user includes causing a company server machine to generate or update an employee dashboard in which the user is represented.

An eleventh embodiment provides a method according to any of the first through tenth embodiments, further comprising:
receiving, by one or more processors of the consolidation server machine, a search parameter from the browser of the user;
obtaining, by one or more processors of the consolidation server machine, a search result that corresponds to the supplier server machine by performing a search based on the search parameter; and
receiving, by one or more processors of the consolidation server machine, a request by the browser to switch from interacting with the consolidation server machine to interacting with the supplier server machine; and wherein:
the mapping of the identifier of the user to the account of the user is in response to the request by the browser to switch from interacting with the consolidation server machine to interacting with the supplier server machine.

A twelfth embodiment provides a method according to any of the first through tenth embodiments, further comprising:
receiving, by one or more processors of the consolidation server machine, a search parameter from the browser of the user;
obtaining, by one or more processors of the consolidation server machine, a search result that corresponds to the supplier server machine by performing a search based on the search parameter; and
receiving, by one or more processors of the consolidation server machine, a request by the browser to switch from interacting with the consolidation server machine to interacting with the supplier server machine; and wherein:
the embedding of the identifier of the user within the URL is in response to the request by the browser to switch from interacting with the consolidation server machine to interacting with the supplier server machine.

A thirteenth embodiment provides a machine-readable medium (e.g., a non-transitory machine-readable storage medium) comprising instructions that, when executed by one or more processors of a first machine (e.g., a consolidation server machine), cause the first machine to perform operations comprising:
mapping an identifier of a user to an account of the user within a database;
embedding the identifier of the user within a uniform resource locator (URL) that, when operated by a browser of the user, causes the browser to interact with a second machine (e g., a supplier server machine);
providing the URL that includes the identifier of the user to the browser of the user, the browser initiating an interaction with the second machine by operating the URL;
receiving interaction result data from the second machine, the interaction result data including the identifier of the user and an interaction detail resultant from the interaction initiated by the browser of the user with the second machine;
detecting that the interaction detail corresponds to the account of the user based on the identifier that was embedded within the URL being both received in the interaction result data and mapped to the account of the user within the database; and
causing inclusion of the interaction detail within an information entry that corresponds to the user based on the detecting that the interaction detail corresponds to the account of the user.

A fourteenth embodiment provides a machine-readable medium according to the thirteenth embodiment, wherein:
the operations further comprise:
generating the identifier of the user prior to the mapping of the identifier to the account of the user within the database.

A fifteenth embodiment provides a machine-readable medium according to the thirteenth embodiment or the fourteenth embodiment, wherein:
the operations further comprise:
receiving a request from the browser of the user, the request being to initiate the interaction by the browser with the supplier server machine; and wherein:
the mapping of the identifier of the user to the account of the user is in response to the request to initiate the interaction by the browser with the supplier server machine.

A sixteenth embodiment provides a machine-readable medium according to the thirteenth embodiment or the fourteenth embodiment, wherein:
the operations further comprise:
receiving, by one or more processors of the consolidation server machine, a search parameter from the browser of the user;
obtaining, by one or more processors of the consolidation server machine, a search result that corresponds to the supplier server machine by performing a search based on the search parameter; and receiving, by one or more processors of the consolidation server machine, a request by the browser to switch from interacting with the consolidation server machine to interacting with the supplier server machine; and wherein:
the embedding of the identifier of the user within the URL is in response to the request by the browser to switch from interacting with the consolidation server machine to interacting with the supplier server machine.

A seventeenth embodiment provides a system (e.g., a consolidation server machine) comprising:
one or more processors; and
a memory storing instructions that, when executed by at least one processor among the one or more processors, cause the system to perform operations comprising:
mapping, by the one or more processors, an identifier of a user to an account of the user within a database;
embedding, by the one or more processors, the identifier of the user within a uniform resource locator (URL) that, when operated by a browser of the user, causes the browser to interact with a supplier server machine;
providing, by the one or more processors, the URL that includes the identifier of the user to the browser of the user, the browser initiating an interaction with the supplier server machine by operating the URL;
receiving, by the one or more processors, interaction result data from the supplier server machine, the interaction result data including the identifier of the user and an interaction detail resultant from the interaction initiated by the browser of the user with the supplier server machine;
detecting, by the one or more processors, that the interaction detail corresponds to the account of the user based on the identifier that was embedded within the URL being both received in the interaction result data and mapped to the account of the user within the database; and
causing, by the one or more processors, inclusion of the interaction detail within an information entry that corresponds to the user based on the detecting that the interaction detail corresponds to the account of the user.

An eighteenth embodiment provides a system according to the seventeenth embodiment, wherein:
the operations further comprise:
receiving a request from the browser of the user, the request being to initiate the interaction by the browser with the supplier server machine; and wherein:
the embedding of the identifier of the user within the URL is in response to the request to initiate the interaction by the browser with the supplier server machine.

A nineteenth embodiment provides a system according to the seventeenth embodiment or the eighteenth embodiment, wherein:
the causing, by the one or more processors of the system, of the inclusion of the interaction detail within the information entry that corresponds to the user includes causing a company server machine to generate or update an expense report that corresponds to the user.

A twentieth embodiment provides a system according to the seventeenth embodiment or the nineteenth embodiment, wherein:
the operations further comprise:
receiving, by the one or more processors of the system, a search parameter from the browser of the user;
obtaining, by the one or more processors of the system, a search result that corresponds to the supplier server machine by performing a search based on the search parameter; and receiving, by the one or more processors of the system, a request by the browser to switch from interacting with the system to interacting with the supplier server machine; and wherein:
the mapping of the identifier of the user to the account of the user is in response to the request by the browser to switch from interacting with the system to interacting with the supplier server machine.

A twenty-first embodiment provides a carrier medium carrying machine-readable instructions for controlling a machine (e.g., a consolidation server machine) to carry out the method performed in any one of the previous enumerated embodiments (e.g., any of the first through twelfth embodiments).

DETAILED DESCRIPTION

Example methods (e.g., algorithms) facilitate user detection based on a locator-embedded identifier, which may be performed as part of automatically integrating travel data into a travel tracking system, and example systems (e.g., special-purpose machines configured by special-purpose software) are configured to facilitate user detection based on a locator-embedded identifier (e.g., as part of automatically integrating travel data into a travel tracking system). Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments of the systems and methods discussed herein can facilitate automatic integration of travel data for one or more travel components (e.g., flights, hotel room, car rental) booked with a direct travel supplier that directly provides the travel component (e.g., an airline, a hotel, a car rental agency) into a business tracking system. Such automatic integration may in turn be facilitated by detecting a user based on a locator-embedded identifier of that user. For example, a system (e.g., a special-purpose machine) is configured to automatically integrate travel data for one or more travel components booked with the direct travel supplier into the business tracking system. In particular, various example embodiments discussed herein provide mechanisms and logic that assign a unique identifier (UID) (e.g., an identifier that is unique within one or more of the systems discussed herein) to a user and pass the UID to a third-party travel supplier, so that the identifier can be used later to retrieve or identify booking details for the user. The booking details are then used to initiate an automatic update of one or more components associated with a data tracking system.

According to some alternative solutions, a user goes to a preference page of a consolidated travel website or company (e.g., a travel company that provides access to a plurality of airlines, hotels, and car providers) and enters his or her various loyalty membership numbers (e.g., frequent flyer numbers and hotel loyalty numbers) for programs of which he or she is a member. The consolidated travel company then sends a message to each of those program companies (e.g., direct travel suppliers such as a particular airline or a particular hotel chain) indicating the corresponding loyalty membership number and thereby identifying the user. The direct travel supplier makes a note in their database record for the user, and any time the user makes a business booking, the direct travel supplier will automatically send an electronic message with details of that booking to the consolidated travel company. In other alternative implementations, the user logs into a website of the direct travel supplier, using credentials associated with the consolidated travel company. As a result, if the user books business travel directly on a website of the direct travel supplier, the employer will receive all the booking details through the consolidated travel company. The benefit is that the user can go directly to various direct travel supplier websites (e.g., airline or hotel websites) from then on, and all the information for his or her business bookings will automatically flow back to a data tracking system associated with the consolidated travel company, enabling the data tracking system to update the user's expense report, itinerary manager, travel dashboard, and so forth.

However, there are disadvantages with such alternative solutions. For example, some alternative solutions require that the user is already a member of the loyalty program of a direct travel supplier or require the user to proactively provide login credentials. Under these constraints, individuals who are not members cannot use features of these alternative solutions unless they first join the loyalty program or affirmatively log in. As another example, even if the user is a member of the loyalty program, the user has to remember or know to go to the corresponding preference page that is configured to accept submission of his or her loyalty program membership information. As a result, such alternative solutions address only a minority of business users or travelers.

Example embodiments of the systems and methods discussed herein use similar backend technology already established by direct travel suppliers (e.g., airlines and hotels) for pre-existing systems and methods that implement the above-discussed alternative solutions. However, instead of linking the user based on his or her loyalty number or requiring him or her to log in to the website of the direct travel supplier, the example embodiments discussed herein link travel bookings to the user based on a UID that is passed to the direct travel supplier website when the user of the consolidated travel company selects to book his or her travel directly on the travel supplier website. In these example embodiments, the user does not have to be a program loyalty member or perform the above-described login process. In some example embodiments, the user (e.g., a traveler) only needs to be logged in with the consolidated travel company (e.g., as a small business employee). In certain example embodiments, the consolidated travel company generates (e.g., on-the-fly) a random UID that the consolidated travel company maps to the user, whereby the UID is used by the direct travel supplier to track mappings to bookings. As used herein, the term "random" includes theoretical mathematical randomness, as well as more pragmatic and less computationally intensive variants, such as near-randomness and pseudo-randomness. Thus, for example, an airline can map a UID to an airline booking and return that information to the consolidated travel company. Using the same UID, the consolidated travel company can then map the booking to the user (e.g., the traveler).

As used herein, a travel component or travel option may be a "transportation component" pertinent to a transportation service or a vehicle. Examples of transportation components include travel (e.g., one or more legs of a trip) by airplane, train, bus, trolley, ferry, ship, taxicab, rental car, car sharing service, or any suitable combination thereof. Transportation components may include transportation services (e.g., a passenger service) provided by commercial carriers (e.g., airlines, car rental companies, or cruise operators), public transportation (e.g., city buses or regional trains), private operators (e.g., limousine services, charter airplanes, or charter helicopters), or any combination thereof. In some example embodiments, the transportation option specifies that the traveler walk, jog, hike, or ride a bicycle to a particular destination. A travel component may be an "accommodation component" pertinent to accommodation services (e.g., a hospitality service). Examples of accommodation components include one or more stays in a hotel, motel, resort, hostel, bed-and-breakfast inn, boarding house, vacation rental, home sharing service, campground, or any suitable combination thereof. Further examples of accommodation components include reservations at a restaurant, conference facility, health facility (e.g., spa, salon, or massage studio), athletic facility (e.g., gym, pool, or fitness center), or entertainment venue (e.g., theater, sports stadium, amusement park, or museum). In some situations, a travel component may be both a transportation component and an accommodation component (e.g., a compartment in a passenger train, a cabin on a cruise ship, or a bed on an overnight airline flight). A further example of a travel component is trip insurance (e.g., an insurance policy for a set of transportation components, accommodation components, or both).

Accordingly, one or more of the systems and methodologies described herein facilitate solving the technical problem of automatically integrating data from a third-party into a tracking system. In many example embodiments, the systems and methodologies facilitate the automatic integration of travel data from third-party travel suppliers into a business tracking system. The systems and methodologies include logic that generates a random UID for a traveler when a user (e.g., the traveler or an assistant booking on behalf of the traveler) accesses a direct travel supplier from a consolidation server (e.g., a consolidation travel server). The logic adds the generated UID to a uniform resource locator (URL) that is used to redirect the user to a supplier server of the direct travel supplier. Upon completion of a booking (e.g., a business travel booking), booking data that includes booking details (e.g., details of the included travel components) and the UID are transmitted from the supplier server to the consolidation server. The consolidation server parses the booking data to detect the UID and booking details corresponding to the UID.

The booking details are then used by the systems and methodologies described herein to automatically update tracking components associated with, or used by, an employer of the traveler. In many example embodiments, an expense report is automatically generated or updated for the traveler. Furthermore, an itinerary manager associated with the traveler may be automatically updated, or a company dashboard may be automatically updated with the booking details (e.g., out of office status) associated with the traveler.

Accordingly, one or more of the systems and methodologies described herein may obviate a need for certain efforts or resources that otherwise would be involved in users navigating and searching a plurality of travel suppliers, performing numerous searches at each service provider in order to determine different travel components, and manually updating components of a data tracking system with booking details. As a result, by virtue of performing the special features of the systems and methodologies described herein, computing resources used by one or more machines, databases, or devices (e.g., within the environment) may be reduced, and the percentage of a company's business trips that accurately show up in expense reports, itinerary managers, and out-of-office trackers may be increased. Examples of such computing resources include processor cycles, network traffic, memory usage, data storage capacity, power consumption, network bandwidth, and cooling capacity.

Figure 1:
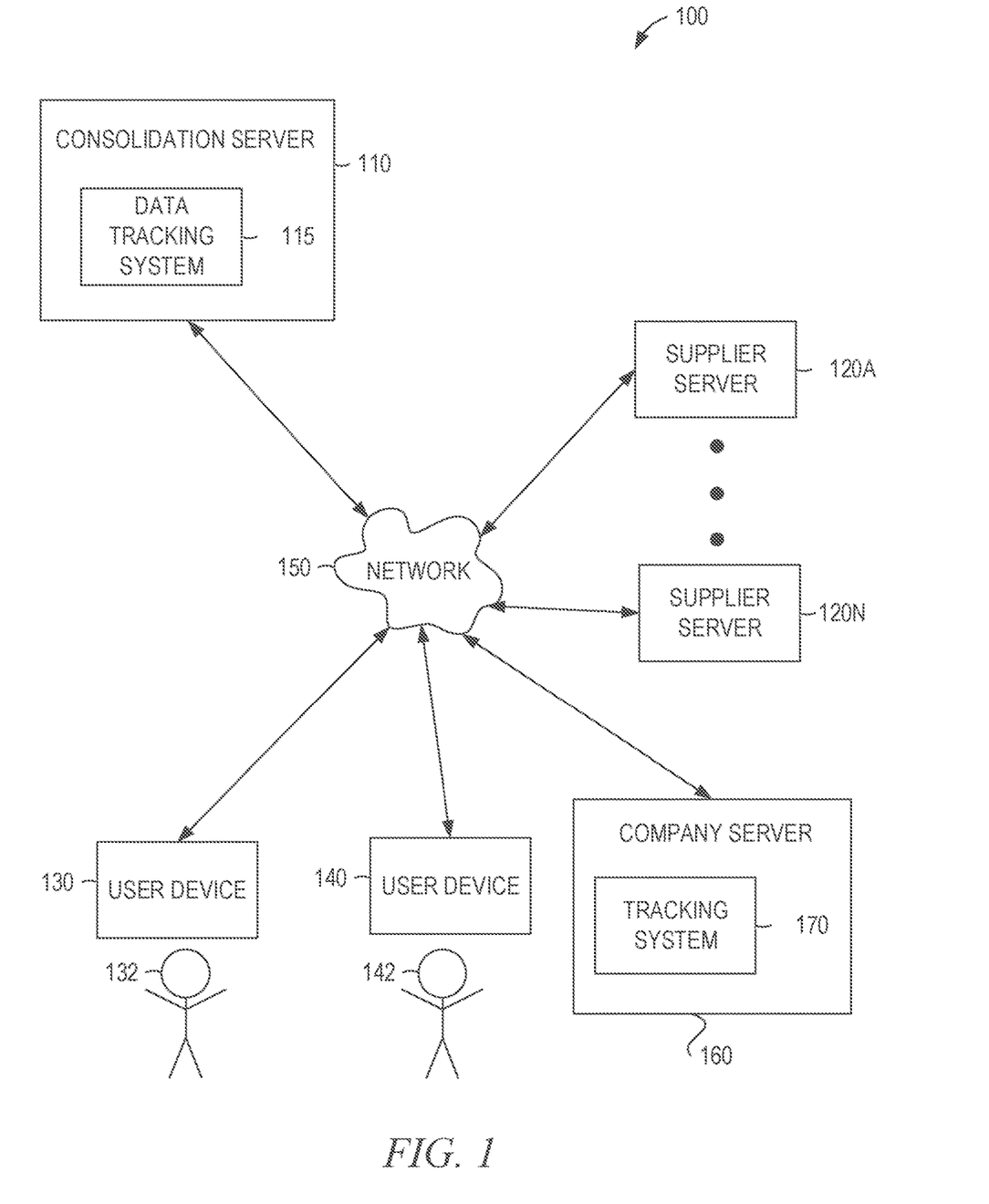
FIG. 1 is a network diagram illustrating a network environment suitable for performing user detection based on a locator-embedded identifier, which may be performed as part of automatically integrating travel data into a travel tracking system, according to some example embodiments.

FIG. 1 is a network diagram illustrating a network environment 100 suitable for user detection based on a locator-embedded identifier (e.g., as part of automatically integrating travel data from a direct travel supplier, which may be referred to herein as "third-party supplier," into a business tracking system), according to some example embodiments. The network environment 100 includes a consolidation server 110, one or more supplier servers 120a-120n (collectively referred to as supplier servers 120), and user devices 130 and 140, all communicatively coupled to each other via a network 150. The consolidation server 110 may include a data tracking system 115. In some example embodiments, the consolidation server 110 forms all or part of a travel service system that provides travel-related services to one or more users (e.g., itinerary management, merchandising of travel components, or any suitable combination thereof). In various example embodiments, the consolidation server 110 obtains travel components from one or more of the supplier servers 120 and presents some or all of the travel components to the users. The users may then book selected travel components directly at the supplier servers 120, and corresponding booking details are automatically provided back to the consolidation server 110.

In some example embodiments, the consolidation server 110 receives data comprising the booking details from a direct travel supplier (e.g., one of the supplier servers 120a-120n among the supplier servers 120), parses the booking details, and automatically updates expense reports, itinerary managers, travel dashboards, or other components of, or associated with, the data tracking system 115. The consolidation server 110 is described in more detail in connection with FIG. 2 and may be implemented in a computer system as described below with respect to FIG. 5.

Each of the supplier servers 120 functions as a data repository that stores data describing one or more travel components. In certain example embodiments, one or more supplier servers (e.g., supplier server 120a) among the supplier servers 120 is operated by a different corresponding direct service provider (e.g., an airline, a hotel management company, a car rental company) or an agent working on their behalf. Accordingly, one or more travel components available from a particular direct service provider or its agent are obtainable (e.g., by purchase, reservation, or both) by users via the corresponding supplier server (e.g., supplier server 120a) for that particular direct service provider or agent. In some example embodiments, one or more supplier servers (e.g., supplier server 120n) among the supplier servers 120 is operated by a separate corresponding third-party service provider that provides services tangentially related to travel. For example, the third-party service provider may provide pet services (e.g., boarding services or pet walking services), taxis, house sitting services, babysitting services, or any suitable combination thereof.

Also shown in FIG. 1 are users 132 and 142. One or both of the users 132 and 142 may be a human user (e.g., a human being), a machine user (e.g., a software program configured to interact with the user device 130), or any suitable combination thereof (e.g., a human assisted by a machine or a machine supervised by human). The user 132 is not part of the network environment 100, but is associated with the user device 130 and may be a user of the user device 130. For example, the user device 130 may be a desktop computer, a tablet computer, or a smartphone belonging to the user 132. Similarly, the user 142 is not part of the network environment 100, but is associated with the user device 140. As an example, the user device 140 may be a tablet computer belonging to the user 142. While only two users (e.g., user 132 and 142) are shown in FIG. 1, any number of users may interact via their respective user devices with the network environment 100. In some example embodiments, the user 132 may be traveler that is booking travel for himself or herself. In other example embodiments, the user 132 is an assistant that is arranging travel on behalf of another user (e.g., user 142). Further still, the users 132 and 142 may be employees of a company that is using the data tracking system 115.

In some example embodiments, a tracking system 170 (e.g., a version of the data tracking system 115 found on the consolidation server 110) is embodied on a company server 160 of a company (e.g., an employer) that employs the users 132 and 142. As another example, the tracking system 170 may be embodied in a server cloud (e.g., maintained by a tracking service provider). In various example embodiments, the consolidation server 110 accordingly receives booking details from the a supplier server (e.g., supplier server 120a) among the supplier servers 120, determines, based on the UID, the user (e.g., user 132) corresponding to the booking details, and forwards the booking details to the tracking system 170 at the company server 160 that corresponds to the user 132. The tracking system 170 at the company server 160 may then use the booking details to update components (e.g., expense report, dashboard) of the company's tracking system 170.

Any of the machines, databases, or devices (each also referred to as a "machine") shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 5. As used herein, a "database" is a data storage resource and may store data structured as a text file, a table, a spreadsheet, a relational database, a triple store, a key-value store, or any suitable combination thereof. Moreover, any two or more of the machines illustrated in FIG. 1 may be combined into a single machine, and the functions described herein for any single machine may be subdivided among multiple machines.

The network 150 may be any network that enables communication between machines (e.g., the consolidation server 110 and the user device 130). Accordingly, the network 150 may be a wired network, a wireless network (e.g., a mobile network), or any suitable combination thereof. The network 150 may include one or more portions that constitute a private network, a public network (e.g., the Internet), or any suitable combination thereof.

Figure 2:
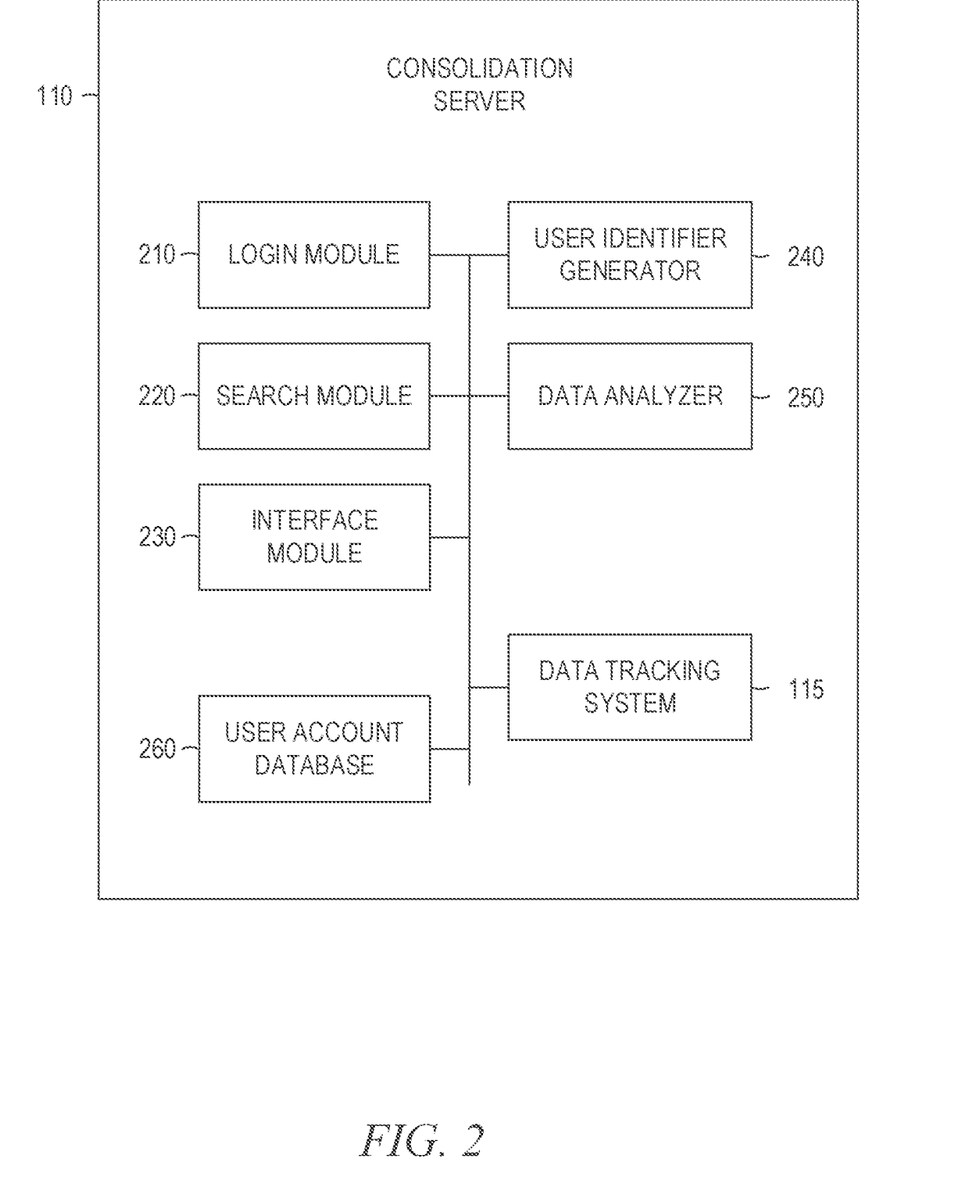
FIG. 2 is a block diagram illustrating components of a consolidation server, according to some example embodiments.

FIG. 2 is a block diagram illustrating components of the consolidation server 110, according to some example embodiments. The consolidation server 110 provides access to travel components from one or more of the supplier servers 120 (e.g., at a single network location, such as a single website) and manages the automatic integration of travel data for travel booked at that supplier server (e.g., supplier server 120*a*) into the data tracking system 115 of the consolidation server 110. Accordingly, the consolidation server 110 comprises a login module 210, a search module 220, an interface module 230, a user identifier generator 240, a data analyzer 250, and the data tracking system 115, all of which may be configured to communicate with each other (e.g., via a bus, shared memory, or a switch). The consolidation server 110 also includes a user account database 260 that is configured to communicate with the other components of the consolidation server 110. Any one or more of the components (e.g., modules, generators, receivers, or analyzers) described herein may be implemented using hardware (e.g., a processor of a machine) or a combination of hardware and software. Moreover, any two or more of these components may be combined into a single component, and the functions described herein for a single component may be subdivided among multiple components.

The login module 210 manages user accounts at the consolidation server 110. In some example embodiments, a user (e.g., user 132) is logged in with the consolidation server 110 in order to use the functions of the data tracking system 115. In certain example embodiments, a company (e.g., employer) of the user enables the data tracking system 115 by subscribing for services associated with the data tracking system 115.

The search module 220 is configured to manage searching at the consolidation server 110. Accordingly, the search module 220 provides one or more user interfaces and interface elements that allow the user (e.g., user 132) to enter parameters to search for travel components. In some cases, the user may indicate that they are searching for travel components on behalf of another user (e.g., an assistant searching for their boss, who may be the user 142). Using the parameters, the search module 220 in conjunction with the interface module 230 obtains one or more search results from one or more of the various supplier servers 120 and presents the results to the user (e.g., causes the user device 130 to present the results to the user 132).

The interface module 230 is configured to manage exchange of information between the consolidation server 110 and any one or more of the supplier servers 120. In some example embodiments, the interface module 230 communicates via an application programming interface (API) with one or more of the supplier servers 120 (e.g., server 120*a*, which may correspond to a direct travel supplier or provider) and accordingly provides one or more of the supplier servers 120 with the parameters entered by the user (e.g., user 132). The supplier server (e.g., supplier server 120*a*) then performs a search of its inventory for travel components that match the parameters. The results are returned through the interface module 230 and presented by the search module 220 (e.g., caused to be presented by the user device 130 to the user 132).

In some example embodiments, the consolidation server 110 allows the user (e.g., user 132) to obtain (e.g., book or purchase) a travel component directly with the direct travel supplier at the corresponding supplier server (e.g., supplier server 120*a*) among the supplier servers 120. In such example embodiments, when the user selects a travel component of a particular travel supplier from the search results, the user is redirected to a website of the particular travel supplier. However, prior to redirecting the user, the user identifier generator 240 generates (e.g., on-the-fly) a random UID for the user. In a case where the user is a first user that is booking travel on behalf of a second user (e.g., the traveler, which may be the user 142), the UID is generated and associated with the second user (e.g., user 142). In alternative example embodiments, two UIDs may be generated and passed to the supplier server: one UID for the first user creating the booking (e.g., "the arranger") and a second UID for the second user (e.g., the traveler). In such example embodiments, the data tracking system 115 may include an indication of the arranger in a corresponding expense report, itinerary manager, or travel dashboard.

Once the UID is generated, the interface module 230 adds the UID as a parameter to a URL that is used to transfer the user to the corresponding supplier server (e.g., supplier server 120*a*). For example, the transfer of the user 132 may be performed by causing the device 130 of the user 132 to open a particular webpage of the corresponding supplier server. The corresponding supplier server (e.g., supplier server 120*a*) records the user using the UID for that session. At the end of the session, if the user (e.g., user 132) books a travel component, the supplier server (e.g., supplier server 120*a*) can provide the corresponding booking data, along with the UID, back to the consolidation server 110.

The data analyzer 250 receives the booking data from each of one or more supplier servers (e.g., supplier server 120*a*) among the supplier servers 120 and manages the analysis and processing of the received booking data. In some example embodiments, the booking data may be returned (e.g., transmitted by the supplier server 120) as soon as the booking is completed. In such example embodiments, the relevant supplier server (e.g., supplier server 120*a*) makes an API call to the consolidation server 110 and provides the booking data. In other example embodiments, the booking data may be sent (e.g., uploaded) at a predetermined time or when a predetermined number of bookings have been made. For example, booking data for any number of users (e.g., users 132 and 142) may be returned in a daily or hourly batch. The data analyzer 250 receives the booking data and parses the booking data to identify one or more UIDs in the booking data, along with corresponding booking details (e.g., the travel components booked for each user). The booking details are then provided to the data tracking system 115. In various example embodiments, the data analyzer 250 accesses the user account database 260 to determine which user corresponds to each UID. In such example embodiments, the booking details are passed to the data tracking system 115, along with an indication of which user corresponds to which set of booking details.

The data tracking system 115 receives the booking details associated with each UID and corresponding user (e.g., user 132). The data tracking system 115 then automatically updates any corresponding tracking components associated with the user (e.g., by initiating one or more automatic updates thereof). For example, the data tracking system 115 may automatically create or update an expense report associated with the user using the booking details. In another example, the data tracking system 115 may automatically update an itinerary manager or a dashboard of the company using the booking details of the user. In various example embodiments, the data tracking system 115 initiates an update of a component at the company tracking system 170.

As a more detailed example, the consolidation server 110 (e.g., the search module 220) may provide the device 130 of the user 132 with a series of flight options from one or more airlines, and then cause the device 130 to display one or more of the provided flight options. The user 132 may request to book a provided flight option directly from XYZ Airlines (e.g., selects a flight option from XYZ Airlines). In response to the selection, the user identifier generator 240 generates a UID of "123" and notes that UID (e.g., stores the UID as corresponding to the user 132) in the user account database 260. The interface module 230 then adds a parameter that indicates the UID to a URL that can be used to transfer the device 130 of the user 132 to the supplier server for XYZ Airlines (e.g., to a website hosted by the corresponding supplier server 120a). In particular, the URL may indicate the flight details to show the user 132 and the user's UID (e.g., "123").

The supplier server for XYZ Airlines may accordingly record the user 132 as "123" for a current session. During the session, the user 132 can navigate around a website of the supplier server for XYZ Airlines, book the original flight, or book one or more different flights. At the end of the session, if the user books a flight, the supplier server for XYZ Airlines sends the booking data (e.g., an electronic message) to the consolidation server 110, and the sent booking data may include the user's UID that was previously passed in the URL. Using this same UID, the data analyzer 250 identifies the user 132 and the booking details and then passes both to the data tracking system 115. The data tracking system 115 can then update or generate expense reports for the user, add the booking details to the user's itinerary manager, add the booking details to a dashboard corresponding to an employer of the user, or any suitable combination thereof.

To recap selected aspects of the foregoing examples, a UID of the user 132 is generated for the user 132 and embedded in a URL that indicates the supplier server of XYZ Airlines (e.g., supplier server 120a). The correspondence relationship between the user's UID and the user 132 is noted in the user account database 260. The URL is provided to the device 130 of the user 132, and the URL, when operated by the device 130, causes a browser to navigate to a website served by the supplier server of XYZ Airlines (e.g., supplier server 120a). The supplier server of XYZ Airlines extracts the user's UID from the URL, when serving the website to the device 130 and may associate actions of the user 132 with that UID (e.g., during the same browser session that was started when the browser navigated the website). In response to the user 132 booking a flight from XYZ Airlines via its supplier server (e.g., during the same browser session), the supplier server sends the booking details and the user's UID to the data tracking system 115. The data analyzer 250 accesses the user account database 260 and, based on the stored correspondence relationship between the user's UID and the user 132, detects that the user 132 is associated with the received booking details. Based on this user detection, the data tracking system 115 next receives the booking details and the UID and then performs one or more data updating tasks (e.g., generating or updating an expense report, an itinerary manager, or an employer dashboard).

Figure 3:
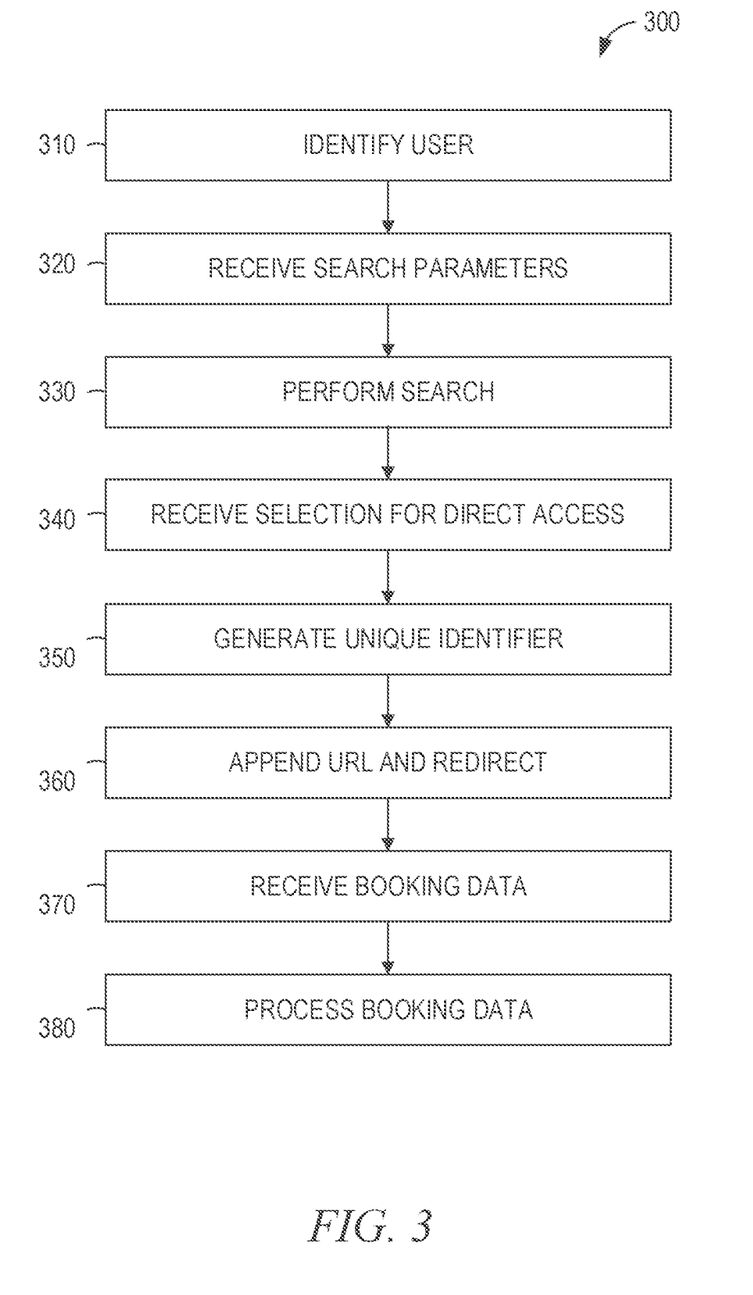
FIG. 3 is a flowchart illustrating operations of a method of performing automatic integration of travel data into a travel tracking system, including performing detection of a user based on a locator-embedded identifier, according to some example embodiments.

FIG. 3 is a flowchart illustrating operations of a method 300 for, inter alia, managing the automatic integration of travel data into business tracking systems, according to some example embodiments. Such managing may be performed as part of automatically integrating travel data from a direct travel supplier, and such managing may include performing user detection based on a locator-embedded identifier (e.g., as part of automatic integration of such travel data).

Operations in the method 300 may be performed by the consolidation server 110, using components described above with respect to FIG. 2. Accordingly, the method 300 is described by way of example with reference to the consolidation server 110. However, at least some of the operations of the method 300 may be deployed on various other hardware configurations or be performed by similar components residing elsewhere in the network environment 100. Therefore, the method 300 is not intended to be limited to the consolidation server 110.

In operation 310, a user (e.g., user 132) of the consolidation server 110 is identified. In some example embodiments, the user logs in via the login module 210 in order to identify himself or herself to the consolidation server 110 and to take advantage of one or more functions afforded by the consolidation server 110 to the user, such as special discounts or use of the data tracking system 115.

In operation 320, one or more search parameters are received by the search module 220. In some example embodiments, the search module 220 provides one or more user interfaces or interface elements that allow the user (e.g., user 132) to enter such parameters to search for travel components. In some cases, the user may indicate that they are searching for travel components on behalf of another user (e.g., as an assistant in a travel department of a company).

Using the received one or more parameters, the search module 220 (e.g., in conjunction with the interface module 230) causes a search to be performed in operation 330. In some example embodiments, the interface module 230 communicates via an API with one or more of the supplier servers 120 (e.g., supplier server 120a, which may be a server of a direct travel supplier or provider, such as an airline or hotel) by providing the one or more of the supplier servers 120 with the parameters received in operation 320. Each supplier server (e.g., supplier server 120a) that receives the parameters then performs a search of its inventory for travel components that match the parameters. The results are returned through the interface module 230 and presented by the search module 220 (e.g., caused by the search module 220 to be presented by the device 130 to the user 132).

In operation 340, a selection for direct access to the supplier server 120 is received. For example, the user (e.g., user 132) may select a travel component of a particular travel supplier from the search results presented in operation 330. The selection may indicate a desire to research the travel component, book the travel component directly with the direct travel supplier, or both. Furthermore, the selection may trigger a redirect to a website of the direct travel supplier at their supplier server (e.g., supplier server 120a) among supplier servers 120.

In response to receiving the selection for direct access, the user identifier generator 240 generates a random UID for the user (e.g., user 132) in operation 350. In some example embodiments, the UID is unique to the consolidation server 110. In certain example embodiments, the UID is unique to the data tracking system 115. In the case where the user (e.g., user 132) is booking travel on behalf of a second user (e.g., user 142), the UID is generated and associated with the second user. The UID may be stored or otherwise associated with an account of the user (e.g., user 132), an account of the second user (e.g., user 142) if applicable, or both, in the user account database 260, which may accordingly map the UID to the corresponding one or more user accounts. In certain example embodiments, the UID is generated earlier (e.g., after operation 310) in the method 300. In such example embodiments, operation 350 retrieves the earlier generated UID for the user.

Once the UID is generated or retrieved, in operation 360, the interface module 230 adds (e.g., prepends, inserts, or appends) the UID as a parameter to a URL that is used to redirect the user (e.g., user 132) to the supplier server 120.

A device of the user (e.g., device 130 of the user 132) is then redirected to the supplier server of the direct travel supplier (e.g., supplier server 120a), via the URL, and accordingly accesses a web page (e.g., a page within a website) supplied by that supplier server. The supplier server may record or otherwise associate the UID to the user (e.g., user 132) for a current web session. The user is free to navigate a website of the supplier server (e.g., supplier server 120a) and book one or more travel components directly with the corresponding travel supplier. Any bookings made during the session (e.g., one or more bookings that are indicated to be business bookings) will be associated with the UID that was embedded in the URL.

At any point during the web session (e.g., at the end of the web session), if the user books a travel component (e.g., indicated to be a business booking), the supplier server of the direct travel supplier (e.g., supplier server 120a) provides the resultant booking data that includes booking details along with the user's UID (e.g., associated with the current web session) back to the consolidation server 110. Accordingly, in operation 370, the booking data is received by the data analyzer 250 from the supplier server of the direct travel supplier. In some example embodiments, the booking data may be communicated to the consolidation server 110 (e.g., by the supplier server 120a) as soon as the booking is completed (e.g., via an API call to the consolidation server 110). In other example embodiments, the booking data is sent in batches (e.g., uploaded) at a predetermined time or when a predetermined threshold number of bookings have been made.

In operation 380, the data analyzer 250 and the data tracking system 115 process the booking data received by the data analyzer 250 in operation 370. Operation 380 will be discussed in more detail in connection with FIG. 4 below.

Figure 4:
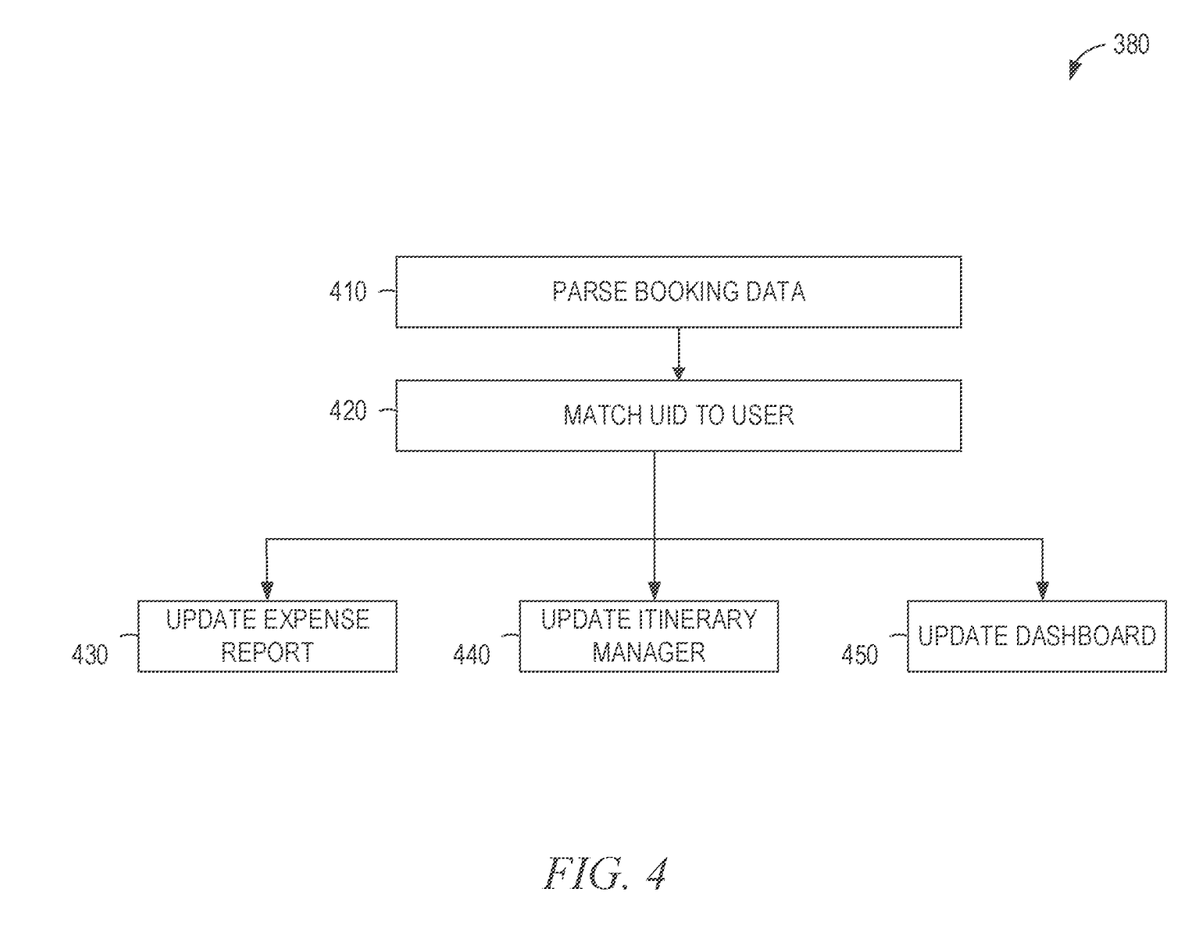
FIG. 4 is a flowchart illustrating operations of a method of automatically integrating travel details, according to some example embodiments.

FIG. 4 is a flowchart illustrating operations of a method (e.g., operation 380) for automatically integrating travel details (e.g., as a result of, or otherwise enabled by, the above-discussed user detection based on the URL-embedded UID), according to some example embodiments. Operations in the method may be performed by the consolidation server 110, using components described above with respect to FIG. 2 (e.g., the data analyzer 250 and data tracking system 115). Accordingly, the method is described by way of example with reference to the consolidation server 110. However, at least some of the operations of the method may be deployed on various other hardware configurations or be performed by similar components residing elsewhere in the network environment 100. Therefore, the method is not intended to be limited to the consolidation server 110.

In operation 410, the data analyzer 250 parses the booking data to detect one or more UIDs (e.g., the UID for the user 132) included therein and obtain booking details also included therein. For example, if the booking data is a daily batch of booking data, then a plurality of booking details corresponding to different UIDs will be detected.

For each UID that is detected in the booking data, the data analyzer 250 matches that UID to a user (e.g., user 132) in operation 420. In some example embodiments, the data analyzer 250 accesses the user account database 260 to determine which user corresponds to the UID being processed.

The booking details are then used to initiate an automatic update of a component associated with a data tracking system (e.g., data tracking system 115). In some example embodiments, the booking details are passed from the data analyzer 250 to the data tracking system 115 along with an indication of which user (e.g., user 132) the booking details correspond to. The data tracking system 115 can use the received booking details and indication to update one or more tracking components (e.g., associated with or used by a company that is an employer of the user 132). Alternatively, the data tracking system 115 may cause an external system (e.g., configured similarly to the data tracking system 115) to update one or more tracking components (e.g., associated with or used by the company, such as a tracking system or component on a company server).

Accordingly, any one or more of operations 430-450 may be performed or caused to be performed by the data tracking system 115. In operation 430, the booking details for a particular user (e.g., user 132) are used to automatically generate or update an expense report for the particular user. In operation 440, the booking details for the particular user are used to automatically generate or update an itinerary manager (e.g., an itinerary managing application) that corresponds to the particular user. In operation 450, the booking details for the particular user are used to automatically update a company dashboard in which the particular user is represented. In some example embodiments, the company dashboard contains information regarding multiple users and indicates each user's in-office or out-of-office status. In certain example embodiments, the company dashboard also indicates a location or other details of the user's itinerary (e.g., whether they are located near where a disaster has just occurred).

While various example embodiments involve the use of a generated UID to track one or more bookings for a user (e.g., user 132), alternative example embodiments may use a tracking pixel to track such bookings. In such example embodiments, a cookie is sent (e.g., to the device 130) when the user is using a browser to interact with the consolidation server 110. Additionally, a consolidation server pixel is embedded on the website of the supplier server (e.g., supplier server 120a) of the direct travel provider, and the supplier server may include one or more of the booking details in the pixel's parameters. Thus, when the supplier server includes that consolidation server pixel when generating a booking confirmation page, the supplier server, in effect, sends the booking details via the pixel to the consolidation server 110.

For example, the user 132 may select to directly access a website of XYZ Airlines. A pixel for the consolidation server 110 is embedded by the corresponding supplier server (e.g., supplier server 120a) on the website of XYZ Airlines, such that when a person lands on a confirmation page of XYZ Airlines (e.g., for confirming one or more bookings), XYZ Airlines makes an API call to the consolidation server 110 indicating that the user 132 has requested the pixel. The consolidation server 110 detects or otherwise accesses the cookie that was sent when user 132 was interacting with the consolidation server 110 and can thereby identify the user 132 using the cookie. This process bypasses the generation and usage of a UID for the user 132.

However, the booking details are still provided, even though the identity of the user 132 is detectable based on the browser. In some example embodiments, the booking details are received through a pixel request. That is, the supplier server (e.g., supplier server 120a) may include the booking details in the pixel's URL parameters. The request for the pixel from the consolidation server 110 comprises a request for the entire pixel URL, which includes parameters of the booking. As a result, the consolidation server 110 receives the booking details from the pixel's URL. The booking details obtained from the pixel URL may then be used to automatically update the data tracking system 115, as discussed above.

Figure 5:
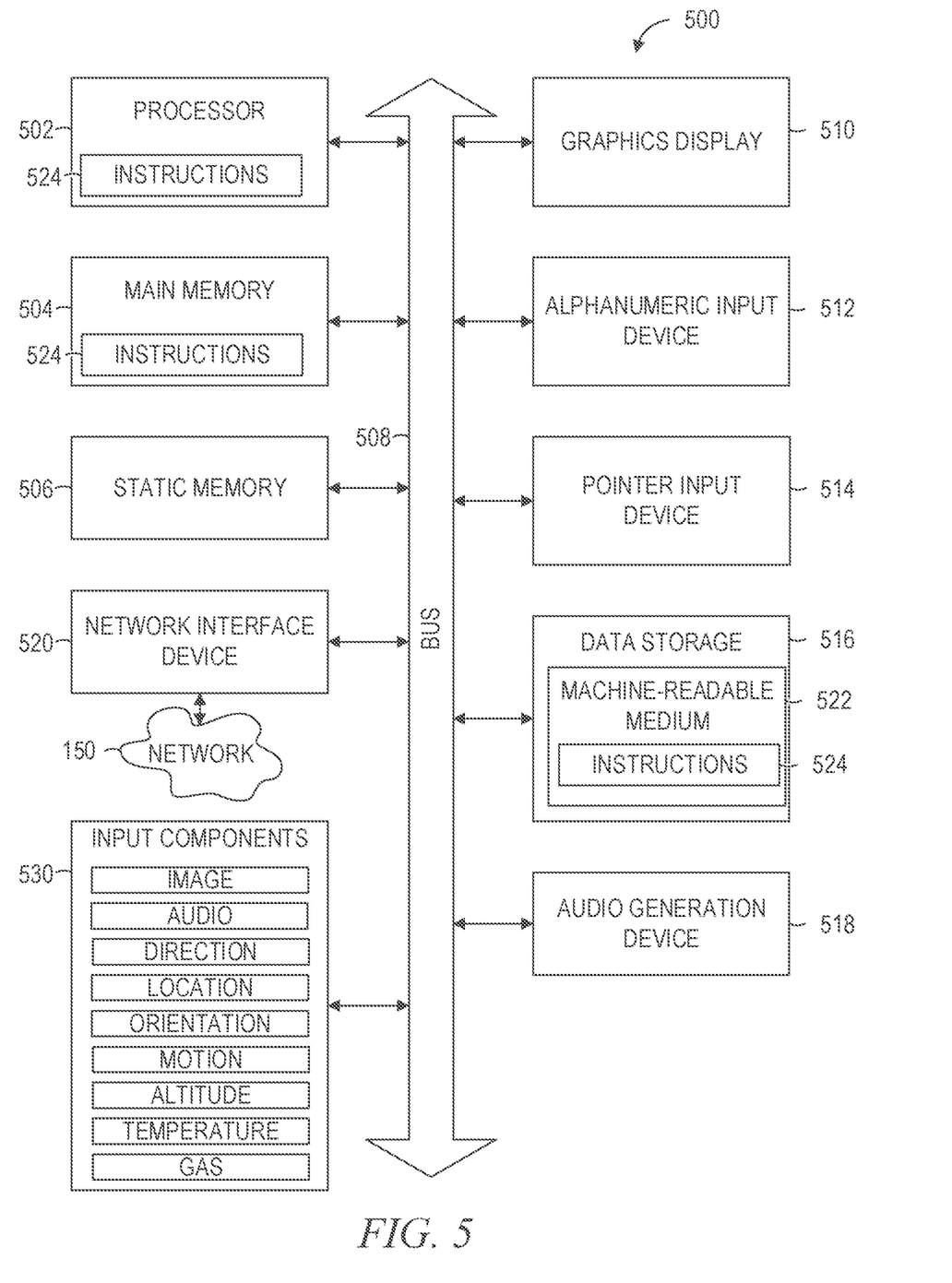
FIG. 5 is a block diagram illustrating components of a machine, according to some example embodiments, able to read instructions from a machine-readable medium and perform any one or more of the methodologies discussed herein.

FIG. 5 illustrates components of a machine 500, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 5 shows a diagrammatic representation of the machine 500 in the example form of a computer device (e.g., a computer) and within which instructions 524 (e.g., software, a program, an application, an applet, an app, or other executable code) for causing the machine 500 to perform any one or more of the methodologies discussed herein may be executed, in whole or in part.

For example, the instructions 524 may cause the machine 500 to execute the flow diagrams of FIGS. 3 and 4. In one embodiment, the instructions 524 can transform the general, non-programmed machine 500 into a particular machine (e.g., specially configured machine) programmed to carry out the described and illustrated functions in the manner described.

In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 524 (sequentially or otherwise) that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 504, and a static memory 506, which are configured to communicate with each other via a bus 508. The processor 502 contains solid-state digital microcircuits (e.g., electronic, optical, or both) that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein. In some example embodiments, the processor 502 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 500 with at least the processor 502, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 500 may further include a graphics display 510 (e.g., a plasma display panel (PDP), a light emitting diode (LED) display, a liquid crystal display (LCD), a projector, a cathode ray tube (CRT), or any other display capable of displaying graphics or video). The machine 500 may also include an alphanumeric input device 512 (e.g., a keyboard or keypad), a pointer input device 514 (e.g., a mouse, a touchpad, a touchscreen, a trackball, a joystick, a stylus, a motion sensor, an eye tracking device, a data glove, or other pointing instrument), a data storage 516, an audio generation device 518 (e.g., a sound card, an amplifier, a speaker, a headphone jack, or any suitable combination thereof), and a network interface device 520.

The data storage 516 (e.g., a data storage device) includes the machine-readable medium 522 (e.g., a tangible and non-transitory machine-readable storage medium) on which are stored the instructions 524 embodying any one or more of the methodologies or functions described herein. The instructions 524 may also reside, completely or at least partially, within the main memory 504, within the static memory 506, within the processor 502 (e.g., within the processor's cache memory), or any suitable combination thereof, before or during execution thereof by the machine 500. Accordingly, the main memory 504, the static memory 506, and the processor 502 may be considered machine-readable media (e.g., tangible and non-transitory machine-readable media). The instructions 524 may be transmitted or received over the network 150 via the network interface device 520. For example, the network interface device 520 may communicate the instructions 524 using any one or more transfer protocols (e.g., hypertext transfer protocol (HTTP)).

In some example embodiments, the machine 500 may be a portable computing device (e.g., a smart phone, a tablet computer, or a wearable device), and may have one or more additional input components 530 (e.g., sensors or gauges). Examples of such input components 530 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 524 for execution by the machine 500, such that the instructions 524, when executed by one or more processors of the machine 500 (e.g., processor 502), cause the machine 500 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 524 for execution by the machine 500 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 524).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an API). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   generating a random identifier of a user;
   mapping, by one or more processors of a consolidation server machine, the generated random identifier of the user to an account of the user within a database;
   embedding, by one or more processors of the consolidation server machine, the generated random identifier of the user within a uniform resource locator (URL) that, when operated by a browser of the user, causes the browser to interact with a supplier server machine;
   providing, by one or more processors of the consolidation server machine, the URL that includes the generated random identifier of the user to the browser of the user, the browser initiating an interaction with the supplier server machine by operating the URL;
   receiving, by one or more processors of the consolidation server machine, a batch of interaction result data from the supplier server machine, the batch of interaction result data including a plurality of generated random identifiers of users that interacted with the supplier server machine and a corresponding plurality of interaction details of the users that interacted with the supplier server machine, the batch including the generated random identifier of the user and a corresponding interaction detail resultant from the interaction initiated by the browser of the user with the supplier server machine;
   determining, by one or more processors of the consolidation server machine, that the interaction detail corresponds to the account of the user by detecting that the generated random identifier embedded within the provided URL is both included in the received batch of interaction result data and mapped to the account of the user within the database; and
   causing, by one or more processors of the consolidation server machine, an update of a report that corresponds to the account of the user based on the interaction detail determined to correspond to account of the user by the detecting that the generated random identifier embedded within the provided URL is both included in the received batch of interaction result data and mapped to the account of the user within the database.

2. The method of claim 1, wherein:
   the generated random identifier is distinct from a user identifier associated by the supplier server machine with the user.

3. The method of claim 1, wherein:
   the supplier server machine stores no user identifier associated with the user except the generated random identifier of the user.

4. The method of claim 1, wherein:
   the generated random identifier of the user is unique within the consolidation server machine.

5. The method of claim 1, wherein:
   the generating of the random identifier of the user is in response to a request to initiate the interaction by the browser of the user with the supplier server machine.

6. The method of claim 1, further comprising:
   receiving a request from the browser of the user, the request being to initiate the interaction by the browser with the supplier server machine; and wherein:
   the mapping of the generated random identifier of the user to the account of the user is in response to the request to initiate the interaction by the browser with the supplier server machine.

7. The method of claim 1, further comprising:
   receiving a request from the browser of the user, the request being to initiate the interaction by the browser with the supplier server machine; and wherein:
   the embedding of the generated random identifier of the user within the URL is in response to the request to initiate the interaction by the browser with the supplier server machine.

8. The method of claim 1, wherein:
   the causing, by one or more processors of the consolidation server machine, of the update of the report that corresponds to the account of the user includes causing a company server machine to generate or update an expense report that corresponds to the user.

9. The method of claim 1, wherein:
the causing, by one or more processors of the consolidation server machine, of the update of the report that corresponds to the account of the user includes causing a company server machine to generate or update an itinerary manager that corresponds to the user.

10. The method of claim 1, wherein:
the causing, by one or more processors of the consolidation server machine, of the update of the report that corresponds to the account of the user includes causing a company server machine to generate or update an employee dashboard in which the user is represented.

11. The method of claim 1, further comprising:
receiving, by one or more processors of the consolidation server machine, a search parameter from the browser of the user;
obtaining, by one or more processors of the consolidation server machine, a search result that corresponds to the supplier server machine by performing a search based on the search parameter; and
receiving, by one or more processors of the consolidation server machine, a request by the browser to switch from interacting with the consolidation server machine to interacting with the supplier server machine; and wherein:
the mapping of the generated random identifier of the user to the account of the user is in response to the request by the browser to switch from interacting with the consolidation server machine to interacting with the supplier server machine.

12. The method of claim 1, further comprising:
receiving, by one or more processors of the consolidation server machine, a search parameter from the browser of the user;
obtaining, by one or more processors of the consolidation server machine, a search result that corresponds to the supplier server machine by performing a search based on the search parameter; and
receiving, by one or more processors of the consolidation server machine, a request by the browser to switch from interacting with the consolidation server machine to interacting with the supplier server machine; and wherein:
the embedding of the generated random identifier of the user within the URL is in response to the request by the browser to switch from interacting with the consolidation server machine to interacting with the supplier server machine.

13. A non-transitory machine-readable storage medium comprising instructions that, when executed by one or more processors of a first machine, cause the first machine to perform operations comprising:
generating a random identifier of a user;
mapping the generated random identifier of the user to an account of the user within a database;
embedding the generated random identifier of the user within a uniform resource locator (URL) that, when operated by a browser of the user, causes the browser to interact with a second machine;
providing the URL that includes the generated random identifier of the user to the browser of the user; the browser initiating an interaction with the second machine by operating the URL;
receiving a batch of interaction result data from the second machine, the batch of interaction result data including a plurality of generated random identifiers of users that interacted with the second machine and a corresponding plurality of interaction details of the users that interacted with the second machine, the batch including the generated random identifier of the user and a corresponding interaction detail resultant from the interaction initiated by the browser of the user with the second machine;
determining that the interaction detail corresponds to the account of the user by detecting that the generated random identifier embedded within the provided URL is both included in the received batch of interaction result data and mapped to the account of the user within the database; and
causing an update of a report that corresponds to the account of the user based on the interaction detail determined to correspond to account of the user by the detecting that the generated random identifier embedded within the provided URL is both included in the received batch of interaction result data and mapped to the account of the user within the database.

14. The non-transitory machine-readable storage medium of claim 13, wherein:
the generated random identifier is distinct from a user identifier associated by the supplier server machine with the user.

15. The non-transitory machine-readable storage medium of claim 13, wherein:
the operations further comprise:
receiving a request from the browser of the user, the request being to initiate the interaction by the browser with the second machine; and wherein:
the mapping of the generated random identifier of the user to the account of the user is in response to the request to initiate the interaction by the browser with the second machine.

16. The non-transitory machine-readable storage medium of claim 13, wherein:
the operations further comprise:
receiving, by one or more processors of the first machine, a search parameter from the browser of the user;
obtaining, by one or more processors of the first machine, a search result that corresponds to the second machine by performing a search based on the search parameter; and
receiving, by one or more processors of the first machine, a request by the browser to switch from interacting with the first machine to interacting with the second machine; and wherein:
the embedding of the generated random identifier of the user within the URL is in response to the request by the browser to switch from interacting with the first machine to interacting with the second machine.

17. A consolidation server machine comprising:
one or more processors; and
a memory storing instructions that, when executed by at least one processor among the one or more processors, cause the consolidation server machine to perform operations comprising:
generating a random identifier of a user;
mapping, by one or more processors of the consolidation server machine, the generated random identifier of the user to an account of the user within a database;
embedding, by one or more processors of the consolidation server machine, the generated random identifier of the user within a uniform resource locator (URL) that, when operated by a browser of the user, causes the browser to interact with a supplier server machine;

providing, by one or more processors of the consolidation server machine, the URL that includes the generated random identifier of the user to the browser of the user, the browser initiating an interaction with the supplier server machine by operating the URL;

receiving, by one or more processors of the consolidation server machine, a batch of interaction result data from the supplier server machine; the batch of interaction result data including a plurality of generated random identifiers of users that interacted with the supplier server machine and a corresponding plurality of interaction details of the users that interacted with the supplier server machine, the batch including the generated random identifier of the user and a corresponding interaction detail resultant from the interaction initiated by the browser of the user with the supplier server machine;

determining, by one or more processors of the consolidation server machine, that the interaction detail corresponds to the account of the user by detecting that the generated random identifier embedded within the provided URL is both included in the received batch of interaction result data and mapped to the account of the user within the database; and causing, by one or more processors of the consolidation server machine, an update of a report that corresponds to the account of the user based on the interaction detail determined to correspond to account of the user by the detecting that the generated random identifier embedded within the provided URL is both included in the received batch of interaction result data and mapped to the account of the user within the database.

18. The consolidation server machine of claim 17, wherein:

the operations further comprise:

receiving a request from the browser of the user, the request being to initiate the interaction by the browser with the supplier server machine; and wherein:

the embedding of the generated random identifier of the user within the URL is in response to the request to initiate the interaction by the browser with the supplier server machine.

19. The consolidation server machine of claim 17, wherein:

the causing, by one or more processors of the consolidation server machine, of the update of the report, that corresponds to the account of the user includes causing a company server machine to generate or update an expense report that corresponds to the user.

20. The consolidation server machine of claim 17, wherein:

the operations further comprise:

receiving, by one or more processors of the consolidation server machine, a search parameter from the browser of the user;

obtaining, by one or more processors of the consolidation server machine, a search result that corresponds to the supplier server machine by performing a search based on the search parameter; and receiving, by one or more processors of the consolidation server machine, a request by the browser to switch from interacting with the consolidation server machine to interacting with the supplier server machine; and wherein:

the mapping of the generated random identifier of the user to the account of the user is in response to the request by the browser to switch from interacting with the consolidation server machine to interacting with the supplier server machine.

* * * * *